US010925353B1

(12) United States Patent
Fayena (10) Patent No.: US 10,925,353 B1
(45) Date of Patent: Feb. 23, 2021

(54) BUNGEE BEAD APPARATUS

(71) Applicant: David Fayena, Brooklyn, NY (US)

(72) Inventor: David Fayena, Brooklyn, NY (US)

( * ) Notice: Subject to any disclaimer, the term of this patent is extended or adjusted under 35 U.S.C. 154(b) by 0 days.

(21) Appl. No.: 16/363,528

(22) Filed: Mar. 25, 2019

Related U.S. Application Data

(60) Provisional application No. 62/647,978, filed on Mar. 26, 2018.

(51) Int. Cl.
  *A44B 19/26* (2006.01)
  *F16G 11/14* (2006.01)

(52) U.S. Cl.
  CPC ............ *A44B 19/262* (2013.01); *F16G 11/14* (2013.01); *Y10T 24/2586* (2015.01); *Y10T 24/3916* (2015.01)

(58) Field of Classification Search
  CPC ... A44B 19/262; F16G 11/14; Y10T 24/3916; Y10T 24/39; Y10T 24/3987; Y10T 24/47; Y10T 24/2586
  See application file for complete search history.

(56) References Cited

U.S. PATENT DOCUMENTS

| | | | | |
|---|---|---|---|---|
| 5,690,444 A | * | 11/1997 | Yuuki | A44B 19/262 403/268 |
| 5,911,369 A | * | 6/1999 | Yamazaki | A44B 19/262 24/429 |
| 9,877,550 B1 | * | 1/2018 | Chen | A44B 19/262 |
| 2003/0041416 A1 | * | 3/2003 | D'Addario | F16L 3/233 24/15 |
| 2004/0148745 A1 | * | 8/2004 | Moeller | A44B 19/262 24/429 |
| 2009/0265899 A1 | * | 10/2009 | Yang | A44B 19/262 24/429 |
| 2016/0108989 A1 | * | 4/2016 | Symons | A43C 7/06 24/136 R |

* cited by examiner

*Primary Examiner* — Robert Sandy
*Assistant Examiner* — Michael S Lee (57) ABSTRACT

A bungee bead apparatus includes a bead and elastic cord with first and second ends fixedly secured in proximity to, or in contact with, each other at one end of the bead to form a loop. A circumferential recess formed between first and second sides of the bead extends from the bead's first end to its second end, having a cross-sectional height and width to receive the loop of the elastic cord therethrough. The orifice extends at an acute angle, positioned midway between the bead's first and second sides, and begins at the bead's first end in proximity to the first side, and transects the circumferential recess at its second end. The circumferential recess is annular with a depth of about one-half the diameter of the cylindrical elastic cord to receive only a portion therein. The recess and orifice permit two (or more) such apparatus to be linked together.

14 Claims, 12 Drawing Sheets

BUNGEE BEAD APPARATUS

CROSS REFERENCES TO RELATED APPLICATIONS

This application claims priority on U.S. Provisional Application Ser. No. 62/647,978, filed on Mar. 26, 2018, the disclosures of which are incorporated herein by reference.

FIELD OF THE INVENTION

The present invention relates to bungee bead ties, more specifically bungee bead ties that can be interconnected, and/or worn.

BACKGROUND OF THE INVENTION

In present times, individuals are always looking for bungee bead apparatus. Conventional bungees known in the art today often lack key features that make it versatile and modular. The present invention aims to solve this problem by providing a unique bungee bead apparatus. The present invention features a bungee-bead apparatus that can interconnect together to form chains, bracelets, and/or necklaces. Additionally, the bungee-bead apparatus allows a user to tie it on to any existing zipper handle and/or nap-sack connection member, and may couple accessories thereto using the bungee-bead apparatus. The present invention comprises many features that makes it easy to handle, and ergonomic. Various embodiments of the bungee-bead apparatus include many different shapes, colors, and/or patterns that accommodate to the user's needs. In another embodiment of the present invention the apparatus can also operate like a sling-shot device that allows the user to fling the bungee bead as ammunition in a game.

OBJECTS OF THE INVENTION

It is an object of the invention to provide an improved bungee bead apparatus.

It is another object of the invention to provide a bungee bead apparatus that may be easily tied to, and untied from, a handle or other protruding feature that the bungee may be looped around.

It is a further object of the invention to provide a bungee-bead apparatus that can interconnect together with another similar bungee-bead apparatus to form a chain.

It is another object of the invention to provide a bungee-bead apparatus that can operate like a sling-shot device.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with at least one embodiment of the disclosed apparatus, a bungee bead apparatus may broadly include a bead and a bungee type cord.

The bead and bungee type cord can be made by any suitable means such as by forming the bead in a top piece and a bottom piece that may be connected together about the cord by for example a snap fit or adhesive, etc. In another embodiment the bead and the cord may be formed by molding the bead around the cord or other suitable manner.

The bead may be made of a substantially inflexible material formed into a shape to have a length between a first end and a second end of the bead, a width between a first side and a second side of the bead, and a thickness between a top and a bottom of the bead. The edges that would otherwise be formed by adjacent portions of the top, the bottom, the first end, the second end, the first side, and the second side of the bead are each preferably rounded (i.e., are radiused), and may have the same radius, or different values for the radius may be used at various different locations. In one embodiment, the top and the bottom surfaces of the bead are substantially flat and are substantially parallel to each other. Also, in one embodiment the length of the bead may be the same as its width, and in another embodiment the length may be greater than the width to form an elongated shape for the bead. The profile of the elongated shape may be rectangular, or it may be shaped like a race track oval, or it may be elliptical, or it may be any other suitable shape, including, but not limited to, an irregular shape.

The elastic cord may have a length between a first end and a second end thereof, and each of the first end and the second end of the cord may be fixedly secured proximate to each other at the first end of the bead to form a loop. The first end and the second end of the elastic cord are preferably fixedly secured to the first end of the bead to be in contact with each other, to better facilitate its use in other subsequently described embodiments.

In another embodiment of the bungee bead apparatus, the bead may also be formed with a circumferential recess that may be formed on the thickness of the sides of the bead between the top and the bottom of the bead. Also, an orifice may be formed in the bead such that the orifice may have a cross-sectional height and width that is sized to receive the loop of the elastic cord therethrough in a slight clearance fit, or in what would be a slight friction fit when the elastic bungee cord is not stretched from its undeformed state. A clearance fit makes it easier it slip in the elastic cord into the orifice. Also, an elongated or oval shape can prevent the cord from rotating or twisting as the cord is going through the orifice. The orifice may preferably extend from the first end of the bead to the second end of the bead, and may extend at an acute angle with respect to the bottom surface (or top surface). The orifice may begin at the first end of the bead in proximity to the first side, and may terminate at the second end of the bead such that it transects the circumferential recess. The orifice may also preferably extend from the first end of the bead to the second end of the bead in a linear path that may be positioned substantially midway between the first side and the second side of the bead. The embodiment may also include a recess or niche that assists a user in decoupling multiple beads. This embodiment permits the user to connect one such bungee-bead apparatus with another similar bungee-bead apparatus. A plurality of this bungee-bead apparatus may be interconnected to form a bracelet or a necklace.

BRIEF DESCRIPTION OF THE DRAWINGS

The description of the various example embodiments is explained in conjunction with appended drawings, in which.

DETAILED DESCRIPTION OF THE INVENTION

As used throughout this specification, the word "may" is used in a permissive sense (i.e., meaning having the potential to), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that citing herein of any patents, published patent applications, and non-patent literature is not an admission as to any of those references constituting prior art with respect to the disclosed apparatus.

Furthermore, the described features, advantages, and characteristics of any particular embodiment disclosed herein, may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variations resulting from a stack up (i.e., the sum) of a multiplicity of such individual tolerances.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "PressFit Engineering and Design Calculator," available at: www.engineersedge.com/calculators/machine-design/press-fit/press-fit-calculator.htm).

Any described use of a clearance fit indicates that the opening (e.g., a hole) is larger than the part received therein (e.g., a shaft), enabling the two parts to move (e.g. to slide and/or rotate preferably without twisting or jamming when the cord is threaded into the bead) when assembled, where the gap between the opening and the part may depend upon the size of the part and the type of clearance fit (e.g., for a 0.1250 inch shaft diameter the opening may be 0.1285 inches for a close fit and may be 0.1360 inches for a free (running) fit; and for a 0.5000 inch diameter shaft size the opening may be 0.5156 inches for a close clearance fit and may be 0.5312 inches for a free clearance fit). Other clearance amounts may also be used.

Figure 1:
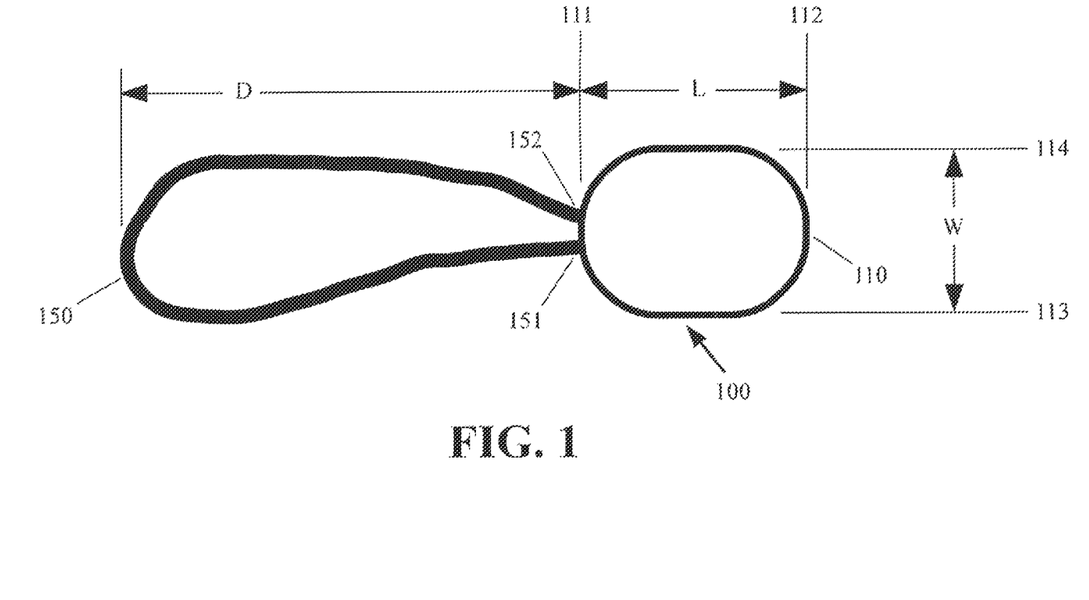
FIG. 1 is a top-view of a first embodiment of a bungee bead apparatus.
Figure 2:
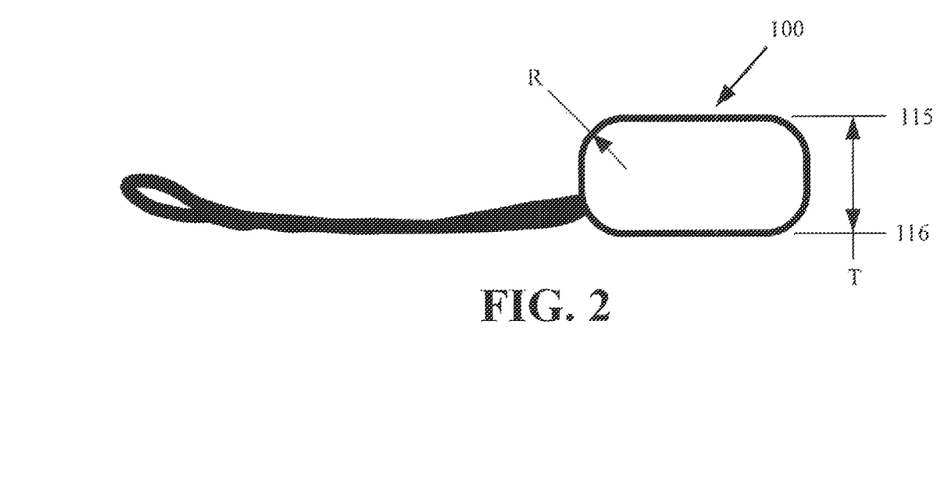
FIG. 2 is a side-view of the bungee bead apparatus of FIG. 1.

FIG. 1 illustrates a first embodiment of a bungee bead apparatus as disclosed herein. The bungee bead apparatus 100 shown in FIG. 1 may be formed of a bead 110 and a cord 150.

The bead 110 may be fabricated from a substantially inflexible material that is preferably a rigid and durable material (e.g., ABS plastic, a composite material, etc.) so that it may serve as an anchor point, while the cord 150 is preferably an elastic cord having a first end 151 and a second end 152 that are each fixedly secured to the bead to form a flexible loop. The ends 151 and 152 may be secured to the bead using any suitable attachment scheme known in the art, including, but not limited to, the following. In one embodiment the cord may be attached by adhesive bonding its ends to the bead. Alternatively, a through-orifice, which may be stepped, may be formed in the bead so that the ends 151 and 152 of cord 150 may be passed therethrough from one side, and may be knotted on the opposite side, so that as the cord is stretched the knot engages the step and prevents detachment/separation of the cord from the bead. Alternatively, a set screw and/or clamp may protrude into the orifice and engage the cord to prevent detachment of the cord from the bead.

The bead and bungee type apparatus can also be made by forming the bead in a top piece and a bottom piece that may be connected together about the cord by for example a snap fit or adhesive, etc. In another embodiment the bead and the cord may be formed by molding the bead around the cord or other suitable manner.

In various embodiments of the present invention, the bead 110 can be formed into any shape that correlates to a user's particular need, and may be formed into any size desired, and any color desired may be used. In one embodiment, as seen in FIG. 1, the bead 110 may be formed to have a generally box-like shape having a length L between a first end 111 of the bead and a second end 112, a width W between a first side 113 of the bead and a second side 114, and a thickness T between a top surface 115 of the bead and a bottom surface 116. Those surfaces may be curved, or may instead be substantially flat (i.e., planar), all of which may be orthogonal to each other, or some or all of which may be at a non-ninety degree angle to each other. Each of the sharp edges/corners that may otherwise be formed by adjacent portions of those surfaces may preferably be rounded with a radius R, which radius may be the same or may instead vary at different intersecting portions of the bead. Various different shapes may be used for the bead 110, which may be formed with a profile that may generally be square and possibly with rounded corners), or may be rectangular, or may be the race track oval shape shown in FIG. 1, or may be an irregular shape, etc. In one embodiment the two ends of the bead may be slightly squared, so that when the beads are linked together (as discussed hereinafter), they fit well with each other.

The first end 151 and the second end 152 of the cord 150 are each preferably fixedly secured at the first end 111 of the bead 110 being in close proximity to each other (see e.g., FIG. 1) to form the flexible loop, and are more preferably fixedly secured at the first end 111 of the bead 110 being in contact with each other.

Figure 3:
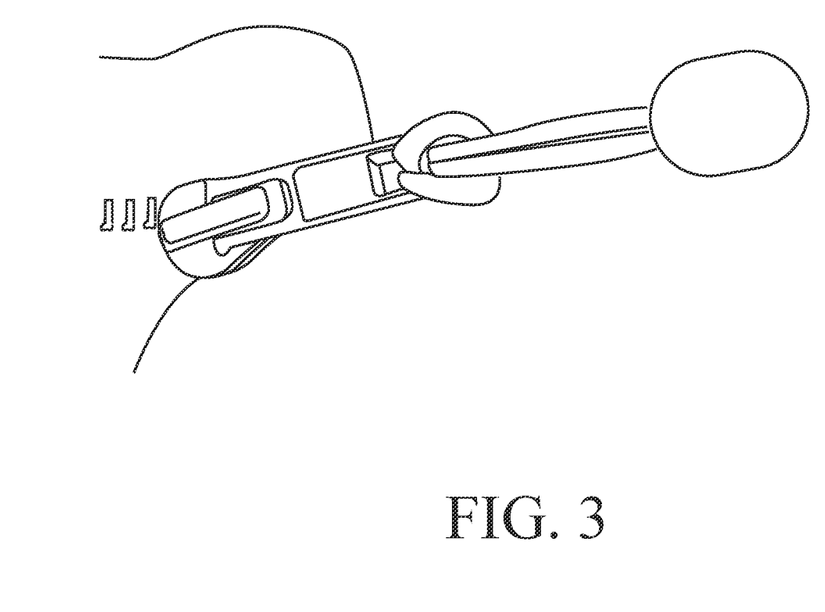
FIG. 3 is a top perspective view showing the bungee bead apparatus of FIG. 1 coupled to an opening in a zipper handle.
Figure 4:
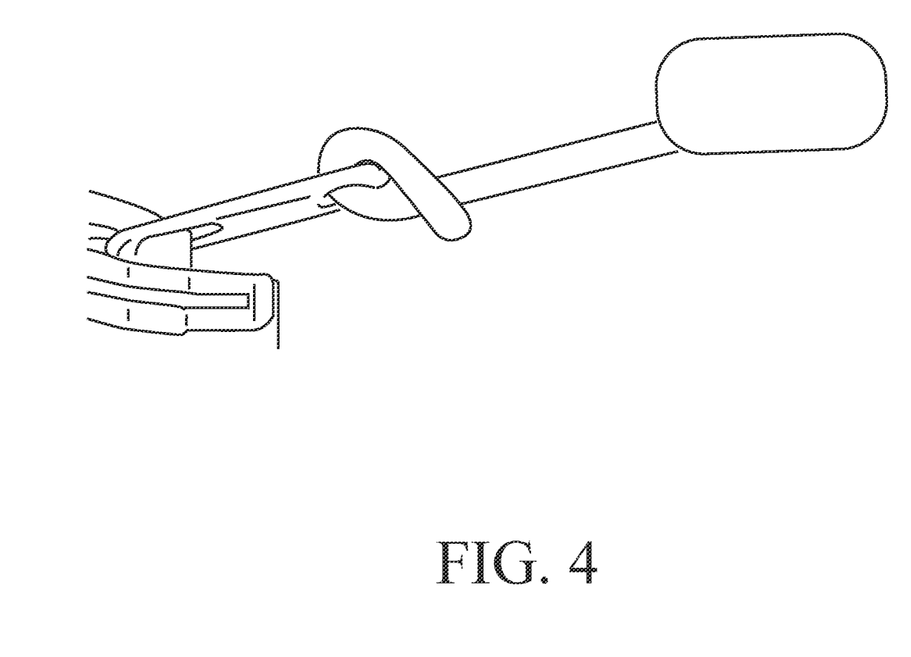
FIG. 4 is a side perspective view showing the bungee bead apparatus coupled to an opening in a zipper handle, as shown in FIG. 3.
Figure 5:
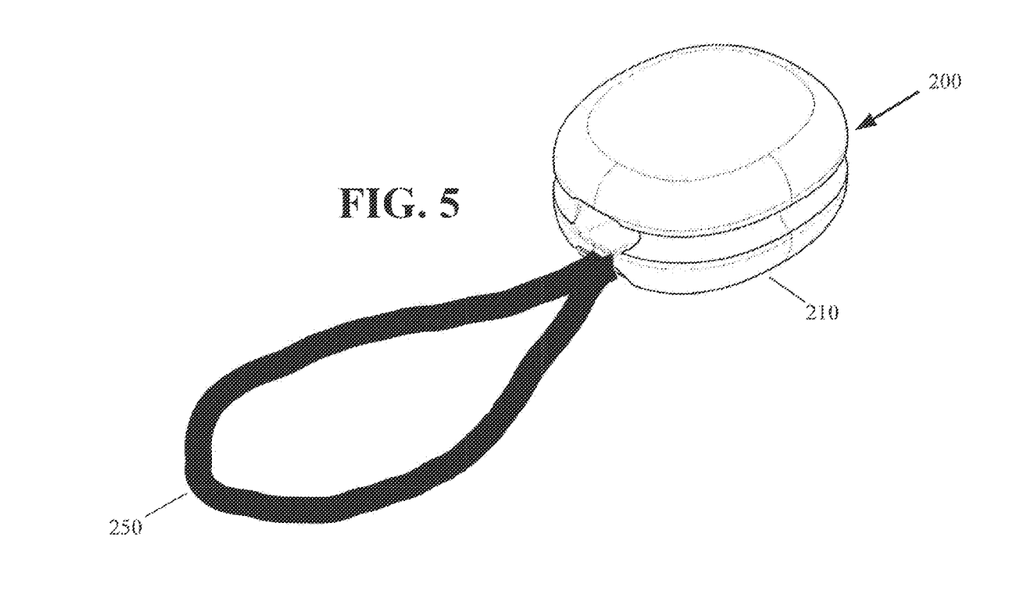
FIG. 5 is a top perspective view showing a second embodiment of a bungee bead apparatus.

The bungee bead apparatus 100 may be used for many different purposes. For example, as shown in FIGS. 3-4 the elastic cord 150 of the bungee bead apparatus 100 may be threaded through an opening on a zipper handle, and the bead may be pushed through the loop to be secured thereto to serve as an extension of the zipper handle that is more easily and more conveniently grasped by the wearer of the apparel to move the zipper handle. For that reason, the loop formed by the elastic cord 150 of the bungee bead apparatus 100 may normally extend at least a distance D (without elastic deformation occurring) that may be at least 1-5 times longer than the length L of the bead in one embodiment, and may preferably be at least 5-10 times longer than the length L of the bead in another embodiment, and may more preferably be at least 10-20 times longer than the length L of the bead in yet another embodiment.

Figure 18:
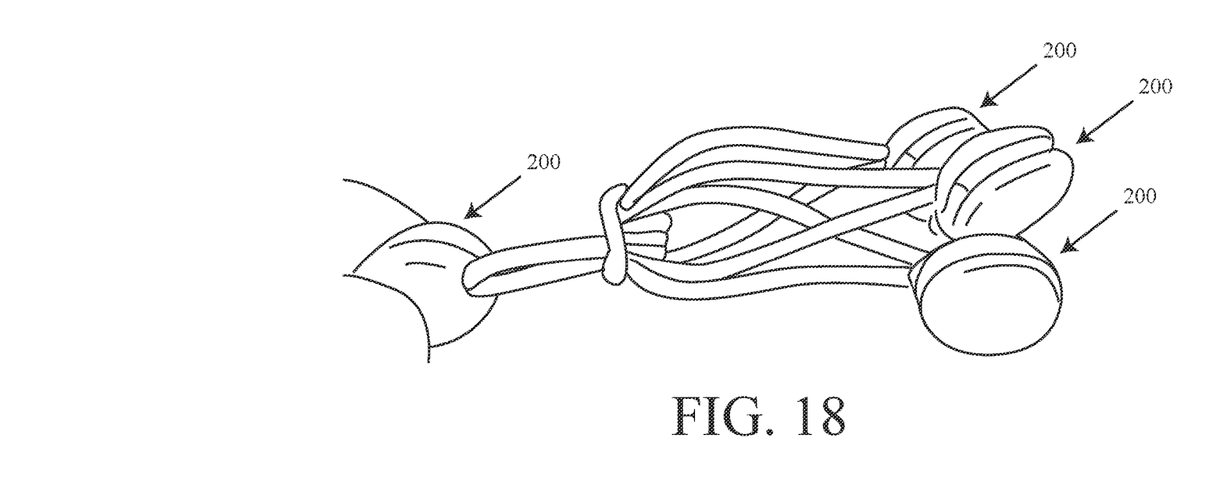
FIG. 18 is a perspective view showing multiple bungee bead apparatuses as shown in FIG. 5 after being tied together using yet another bungee bead apparatus.

The bungee bead apparatus 100 may be used to couple together several items, which is represented in FIG. 18, in which the bungee bead apparatus is looped around several other bungee bead apparatuses to be exemplary, and the bead is then pushed through the loop to be secured about the other items. In general, the bungee bead apparatus 100 may be used as key chains when inserted through its own bungee cord, and can be put on zippers and knapsacks.

The bungee bead apparatus 100 may be used in a game, and may itself be flung at a target, whereby the user wraps the loop of the cord 150 onto a finger, and pulls on the bead 110 to stretch the cord similar to a rubber band. The user then releases the bead to propel the bungee bead apparatus 100 in the direction of the target. The bungee bead apparatus 100 is more effective than the rubber band because of the mass of the bead 110. In addition, the bungee bead apparatus 100 may be used to fling another object like a sling shot, whereby the object (e.g., a bead, a marble, a stone, etc.) can be placed against the bead 110 to stretch the cord and fling the object, rather than flinging the apparatus.

FIGS. 5-12 illustrate a bungee bead apparatus 200 that may be formed of a bead 210 and a cord 250.

Figures 8, 9, 10, 11, 12:
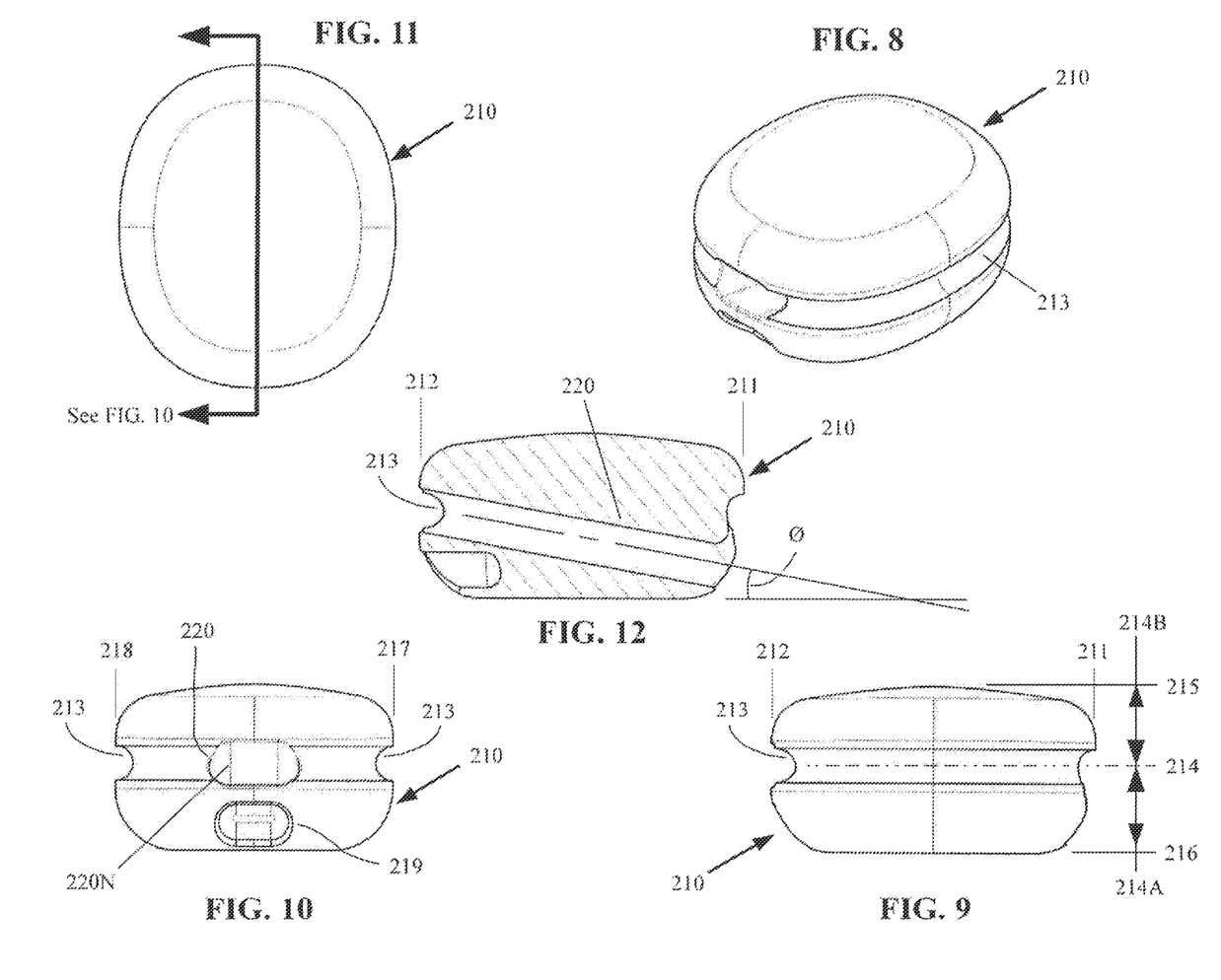
FIG. 8 is an enlarged perspective view of the bead of the bungee bead apparatus shown in FIG. 5.
FIG. 9 is a side view of the bead shown in FIG. 8.
FIG. 10 is an end view of the bead shown in FIG. 8.
FIG. 11 is a top view of the bead shown in FIG. 8.
FIG. 12 is a cross-sectional view through the bead shown in FIG. 8.
Figure 8A:
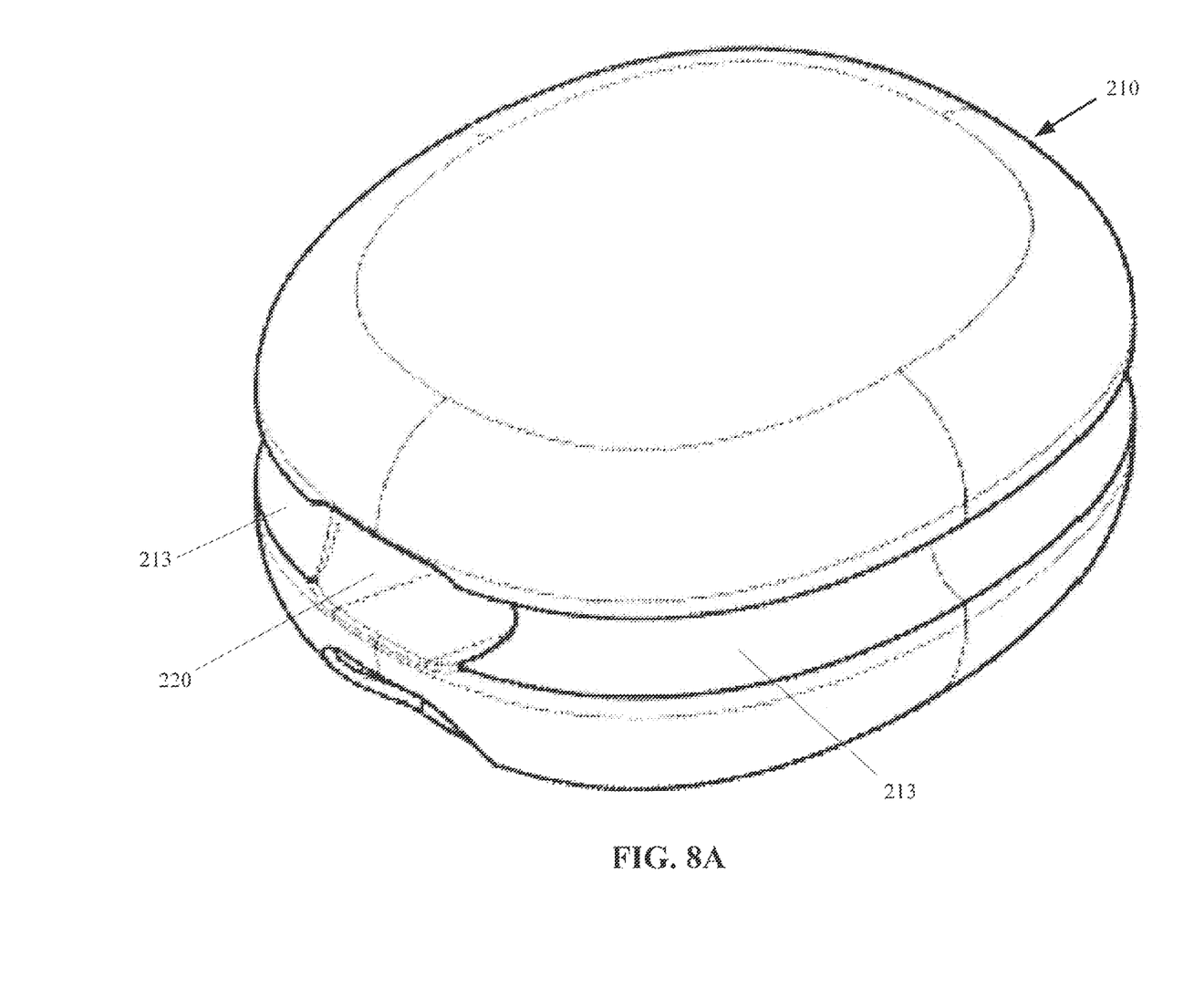
FIG. 8A is the detail perspective view of the bead as shown in FIG. 8, but enlarged even further, and which shows one end of the bead.
Figure 8B:
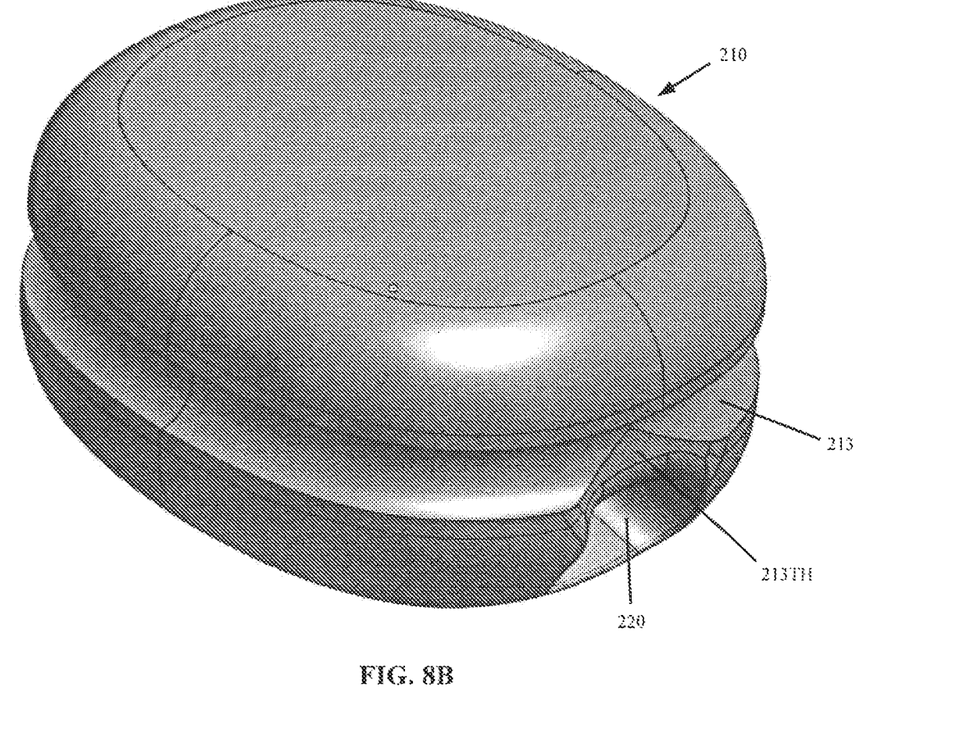
FIG. 8B is another detailed perspective view of the bead as shown in FIG. 8, and which shows another end of the bead.

The cord 250 may be the same as cord 150, and may be attached to the bead 210 in a similar manner (see the race track shaped recess 219 formed proximate to the second end 212 of the bead in FIG. 10), with the ends 251/252 of cord 250, which may be cylindrical, being received in the recess 219 and secured therein. The recess 219 may be sized to receive the ends 251/252 of the cord 250 in a small clearance fit so that they may be secured in proximity to each other, or a slight interference fit when the cord is un-deformed, so that they may be secured to be in contact with each other.

Figure 6:
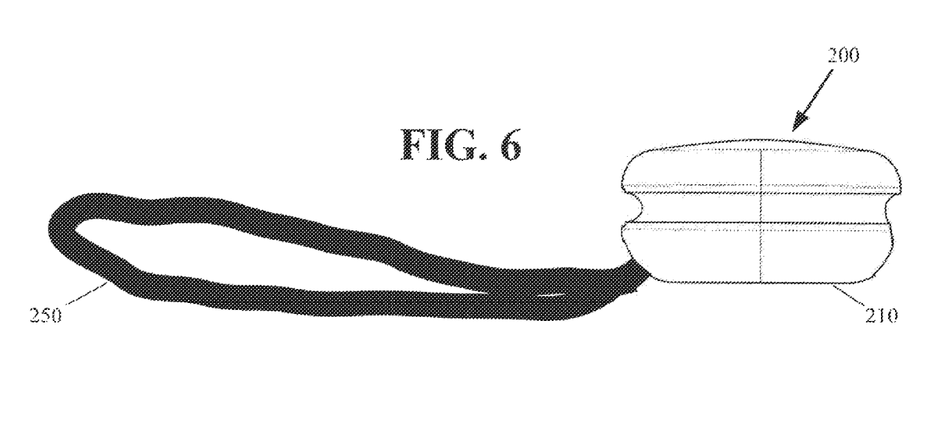
FIG. 6 is a side view of the bungee bead apparatus of FIG. 5.
Figure 7:
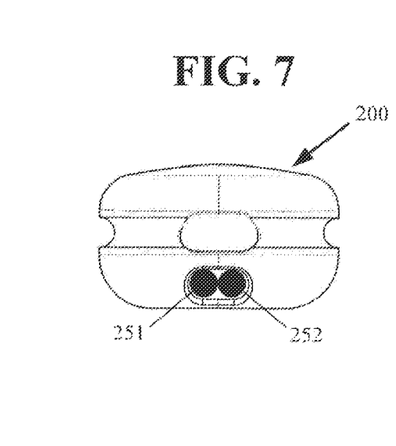
FIG. 7 is an end view of a portion of the bungee bead apparatus of FIG. 5.

The bead 210 may be formed the same as bead 110, but may also include a couple of additional features that provide additional functionality. Those additional features of the bead 210 may be particularly positioned with respect to a first end 211 and a second end 212 of the bead, and a top 215 and a bottom 216 of the bead, which bottom may be flat to rest against the wrist of a person, and which top may be dome shaped as shown in FIG. 6 and FIG. 7. Alternatively, the top and bottom surfaces may be substantially flat and may also be substantially parallel to each other.

As seen in FIGS. 8-10 and FIG. 12, the bead 210 may be formed to include a circumferential recess 213, which may be shaped as an arcuate recess, appearing in cross-section (e.g., as shown in FIGS. 9-10 and 12) as being generally semi-circular. The recess/groove 213 around the middle portion permits the bungee cord of another bungee bead apparatus to wrap around the bead of the first one, and will be held in place in the groove and prevent undesired decoupling.

The arcuate-shaped circumferential recess 213 may be formed to have a center thereof be substantially planar at 214, which center of the recess need not be centered between the top 215 and the bottom 216 of the bead, as it may be disposed to be somewhat closer towards the top than the bottom (i.e., distance 214A may preferably be slightly larger than distance 214B). The arcuate-shaped circumferential recess 213 may be so formed to be disposed closer to the top 215 to be coordinated with the position of a through-orifice 220.

In one embodiment, the circumferential recess 213 of the bungee bead apparatus 200 may be formed with a depth that is greater than the diameter of the cord 250, which may also aid in retaining the cord therein in a friction fit. In another embodiment the circumferential recess 213 of the bungee bead apparatus 200 may be formed with a depth that is about one-half of the diameter of the cord 250 (see FIG. 10), so that a portion of the cord when seated within the recess may nonetheless remain exposed, permitting a person to wedge his/her fingernail between the cord and the bead to effect removal of the cord 250' from the bead 210, to separate the second bungee bead apparatus 200' from the first bungee bead apparatus 200 when desired.

The through-orifice 220 may be formed in the bead 210 to have a cross-sectional height and width to receive the loop of the elastic cord therethrough, and may begin at the first end 211 of the bead and may extend to its second end 212.

The orifice 220 may extend within the bead 210 to be at an acute angle θ with respect to the flat bottom surface 216. The orifice 220 may go through the center of the bead on a diagonal, so that when the beads are linked or coupled, the location of the bungee pulling on the bead is at the bottom portion of the bead (See FIGS. 17 and 19). Additionally, the acute angle prevents interference between the cord and the orifice when the cord is inserted. See side 211 of the bead and FIGS. 14-17.

Figure 20:
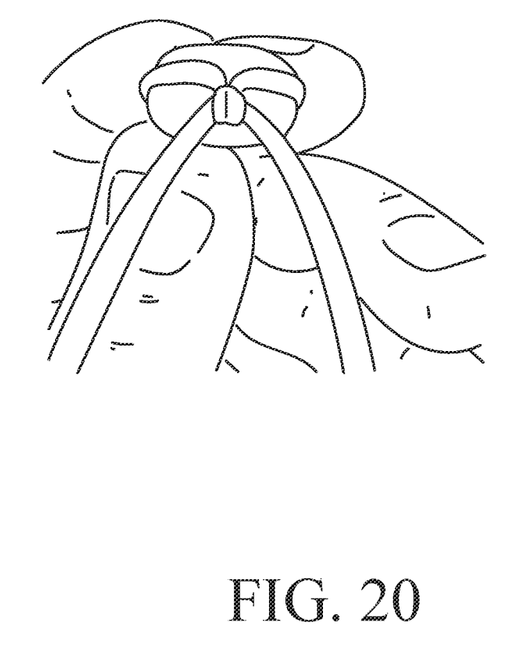
FIG. 20 is an end view of the bead of FIG. 17 with the cord in position.

The orifice 220 may also begin at the first end 211 of the bead 210 in proximity to the bottom surface 216, as seen in the cross-sectional view shown in FIG. 12, and may terminate at the second end 212 such that it may transect the circumferential recess 213 as it curves around the second end of the bead (see FIG. 8A and FIG. 20), so the bungee cord of another bungee bead apparatus that wraps around it is uniform, and not extending out at that location.

The through-orifice 220 may be formed in the bead 210 to have a cross-sectional height and width to receive the loop of the elastic cord therethrough, which is preferably received in a clearance fit when the cord is un-deformed, and more preferably is received in a loose clearance fit throughout most or even all of the orifice, to make its use even easier for a user. Since the cord 250 is preferably substantially cylindrical, the cross-sectional shape of the through-orifice 220 may preferably be formed to be substantially race track shaped as seen in FIG. 10 and may be wide enough for the bungee to fit through with ease. The orifice cross sectional height and width preferably should not be too large (oversized in height/width), in effect preventing the bungee from twisting while inserting it through the orifice.

The through-orifice 220 permits a user to selectively couple together two of the bungee bead apparatus 200, as seen in FIGS. 13-18, to accommodate one of several different uses.

A recess/niche 213TH (see FIG. 8B) may be formed to extend between and interconnect the orifice 220 with the circumferential recess 213, to permit a user to insert his/her fingernail therein, to assist in getting a hold of the elastic cord when disassembling of the coupled bungee bead apparatuses discussed herein. The orifice 220 may also be preferably positioned substantially midway between the first side 217 and the second side 218 of the bead 210, as seen in FIG. 10.

Figure 13:
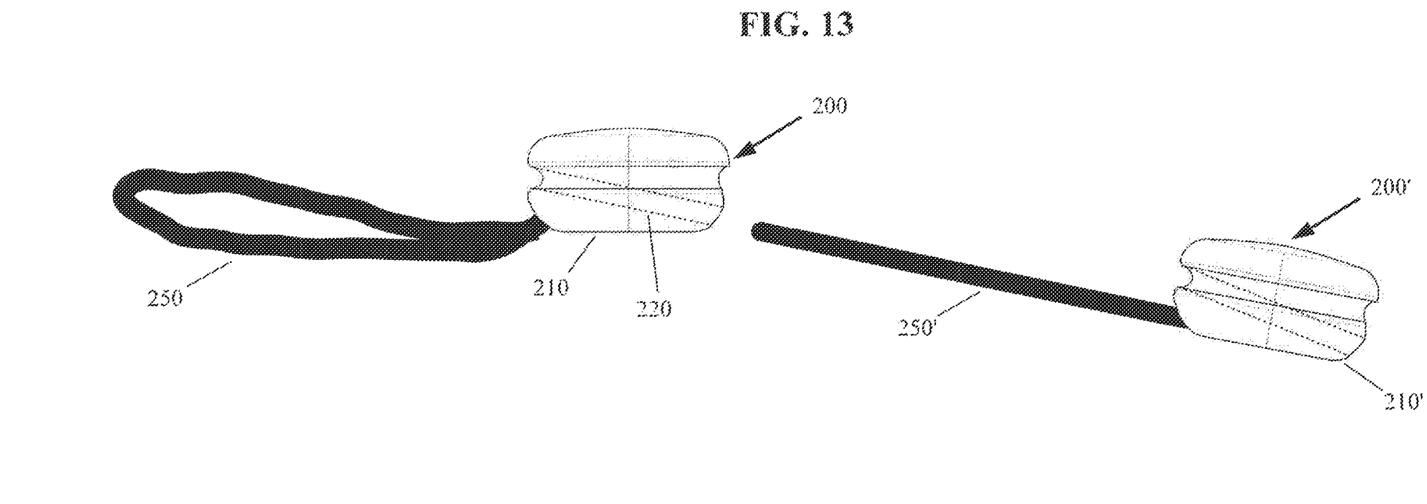
FIG. 13 is a side view showing a first and a second bungee bead apparatus as shown in FIG. 5, prior to being coupled together.
Figure 14:
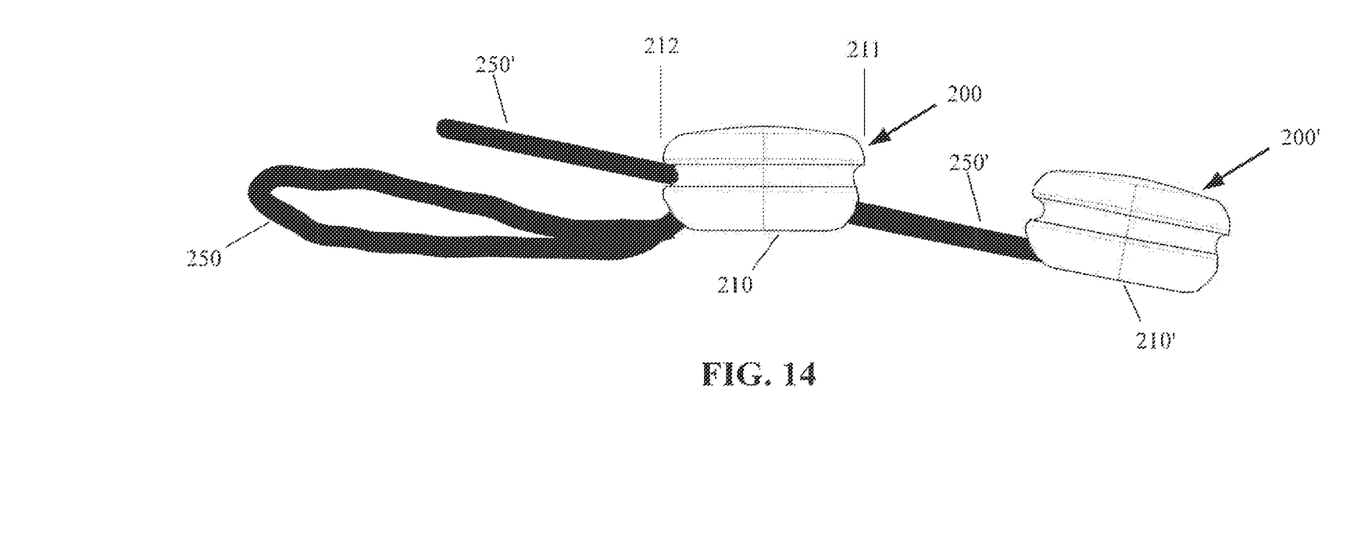
FIG. 14 is the side view of FIG. 13, but is shown after a portion of the cord of the second bungee bead apparatus has been fed through the orifice of the first bungee bead apparatus.
Figure 15:
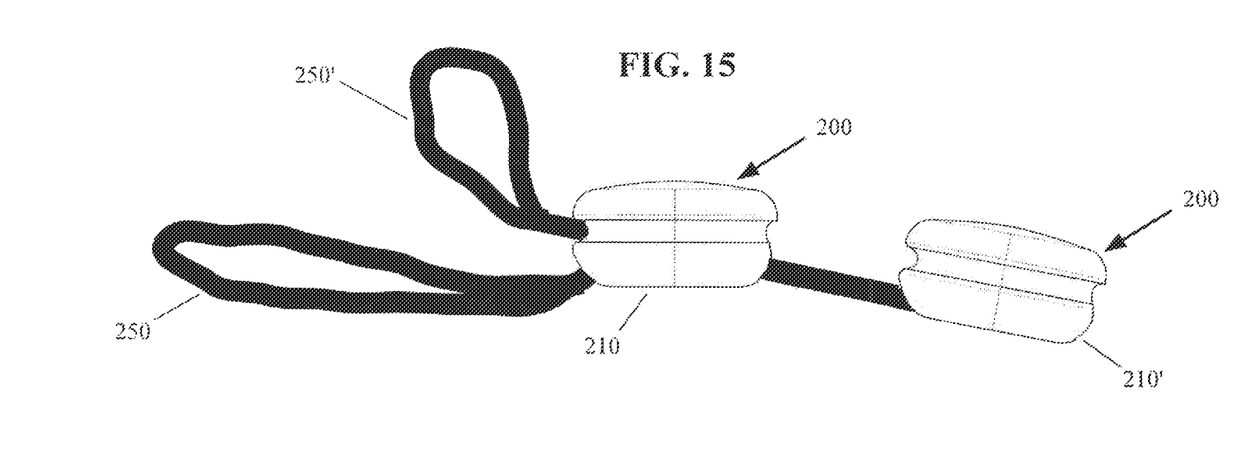
FIG. 15 is the side view of FIG. 14, but showing the end of the loop of the second bungee bead apparatus starting to be directed back toward the bead of the first bungee bead apparatus.
Figure 16:
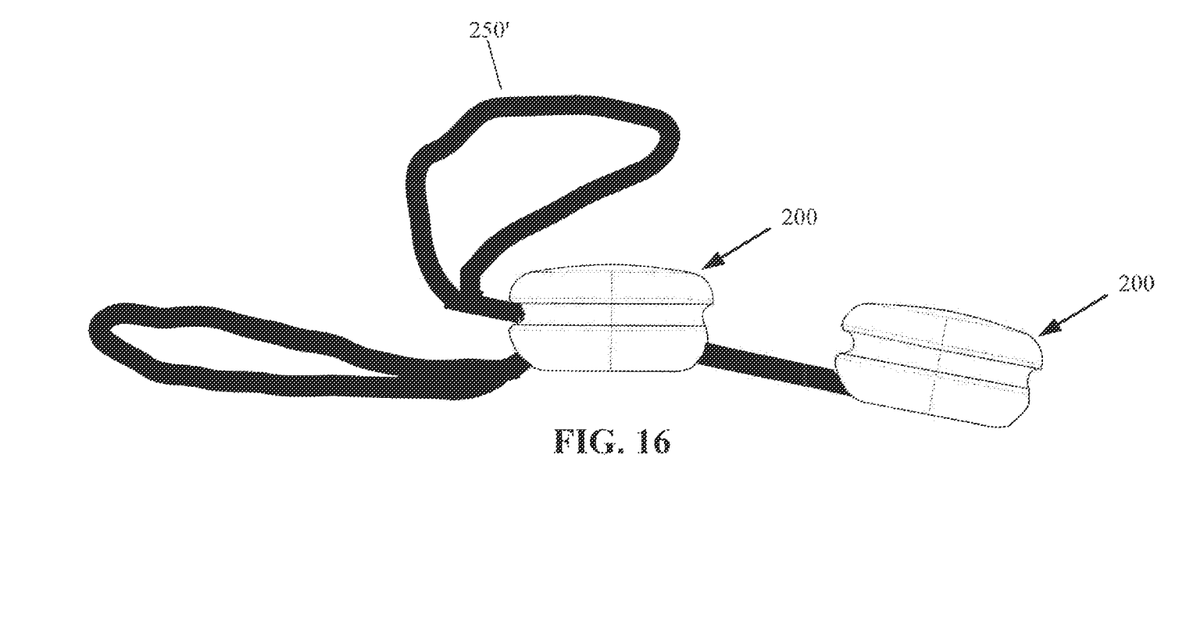
FIG. 16 is the side view of FIG. 15, but showing the end of the loop of the second bungee bead apparatus positioned over the bead of the first bungee bead apparatus.

FIG. 13 shows a first bungee bead apparatus 200 and a second such bungee bead apparatus designated as 200' being positioned adjacent to each other, with the end of the loop of the cord 250' of the second bungee bead apparatus 200' extended to be straightened and directed towards the opening of the orifice 220 at the first end 211 of the bead 210 of the first bungee bead apparatus 200'. As shown in FIG. 14, a portion of the loop of the cord 250' of the second bungee bead apparatus 200' may be fed through the orifice 220 of the bead 210 of the first bungee bead apparatus 200, to have a portion of the cord 250' protruding away from each of the first and second ends 211/212 of the bead 210. FIG. 15 and FIG. 16 illustrate the loop of the cord 250' of the second bungee bead apparatus 200' being drawn back over the top of the bead 210' of the second bungee bead apparatus 200'.

Figure 17:
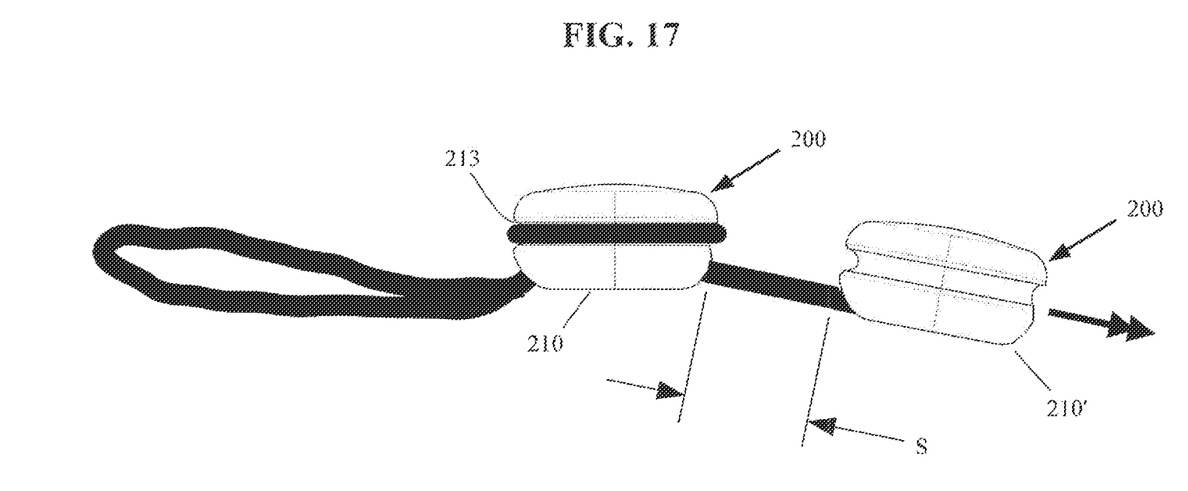
FIG. 17 is the side view of FIG. 16, but showing a portion of the loop of the second bungee bead apparatus received within a circumferential recess formed in the bead of the first bungee bead apparatus.

As seen in FIG. 17, the loop of the cord 250' of the second bungee bead apparatus 200' may then be urged into and positioned to occupy the circumferential recess 213 of the bead 210 of the first bungee bead apparatus 200, to releasably couple the second bungee bead apparatus 200' to the first bungee bead apparatus. Any excess amount of loose cord 250' may be drawn back through the orifice 220 of the first bungee bead apparatus 200 by pulling on the bead 210' of the second bungee bead apparatus 200', as indicated by the double headed arrow in FIG. 17, so that the cord 250 after it exits the orifice 220 at the second end of the bead 210 is seated within the circumferential recess 213. The cord of the second bungee bead apparatus 200' being wrapped around the bead 210 of the first bungee bead apparatus 200 creates an attractive look, especially when connecting different colors. The beads 210 and elastic cords 250 may come in many different colors and materials to create many different combinations.

The length of the cord 250 (see e.g., the "D" dimension in FIG. 1) that is utilized in making the bungee bead apparatus 200 may be selected so that it can be so mounted to another bungee bead apparatus, as shown in FIG. 17, to provide a spacing S between the beads of the adjacent bungee bead apparatuses.

Figure 19:
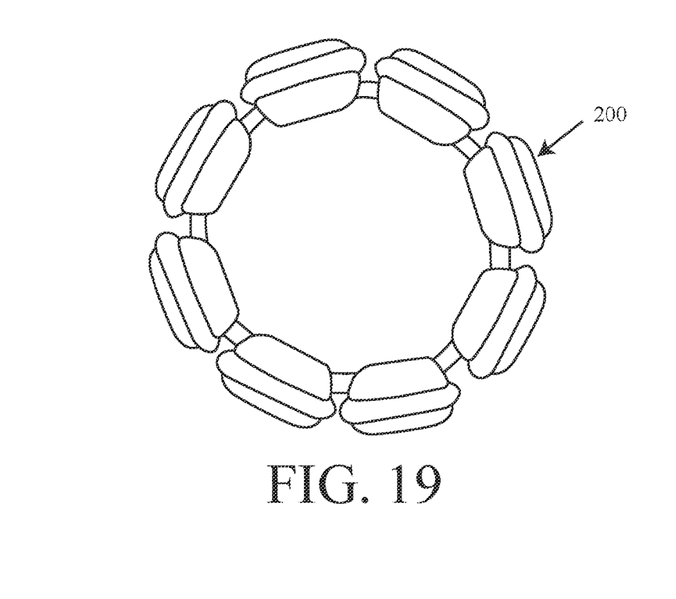
FIG. 19 is a perspective view showing multiple bungee bead apparatuses as shown in FIG. 5 after being coupled together to form a band.

FIG. 19 shows a plurality of the bungee bead apparatus 200 being interconnected as described above to form a continuous bracelet that may be used as a jewelry item by the person, which may be worn on the person's wrist as a bracelet, or on their leg or ankle, or around the neck as a necklace. The beads 210 for those bungee bead apparatuses may be supplied in a plurality of different colors so that the necklace or bracelet may be constructed to have the aesthetic appearance desired by the user. Also, the cords 250 may be supplied in an assortment of different lengths to provide for different spacings S between the beads to achieve various different aesthetic appearances in that respect. It is noted that the elasticity of the cord may help in getting the bracelet or necklace so formed on and off the wrist and/or neck of the person. (The elastic cord loop may be long enough to go through the next bead and fold backwards to wrap around its own bead, while leaving a small space between the two beads when assembled).

While illustrative implementations of one or more embodiments of the disclosed apparatus are provided hereinabove, those skilled in the art and having the benefit of the present disclosure will appreciate that further embodiments may be implemented with various changes within the scope of the disclosed apparatus. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A bungee bead apparatus comprising:
   a bead, said bead comprising a substantially inflexible material shaped to have a length between a first end and a second end of said bead, a width between a first side and a second side of said bead, and a thickness between a top and a bottom of said bead;

an elastic cord, said elastic cord having a length between a first end and a second end of said elastic cord; and wherein each of said first end and said second end of said elastic cord are fixedly secured proximate to each other at said first end of bead to form a loop;

an orifice formed in said bead, said orifice having a cross-sectional height and width to receive said loop of said elastic cord therethrough; and said orifice extends from said first end of said bead to said second end of said bead.

2. The bungee bead apparatus according to claim 1, further comprising:

a circumferential recess formed between said top and said bottom of said bead.

3. The bungee bead apparatus according to claim 2 further comprising a recess extending between and interconnecting said orifice with the circumferential recess, to permit a user to insert a thumbnail therein, to assist in getting a hold of said elastic cord when disassembling a first bungee bead coupled to a second bungee bead.

4. The bungee bead apparatus according to claim 1, wherein said bottom of said head is substantially flat;

wherein said orifice in said bead extends at an acute angle with respect to said substantially flat bottom, and begins at said first end of said bead in proximity to said first side.

5. The bungee bead apparatus according to claim 4, wherein said orifice transects said circumferential recess at said second end of said bead.

6. The bungee bead apparatus according to claim 5, wherein said orifice is positioned substantially midway between said first side and said second side.

7. The bungee bead apparatus according to claim 6, wherein said circumferential recess comprises a substantially semi-circular cross-sectional shape;

wherein said elastic cord comprises a substantially cylindrical cross-sectional shape when un-deformed; and wherein a depth of said circumferential recess is less than about one-half of a diameter of said substantially cylindrical cross-sectional shape of said elastic cord.

8. The bungee bead apparatus according to claim 7, wherein said orifice comprises a race-track shaped cross-section.

9. The bungee bead apparatus according to claim 8, wherein each of said first end and said second end of said elastic cord are fixedly secured in contact with each other at said first end of bead.

10. The bungee bead apparatus according to claim 9, wherein an edge formed by adjacent portions of said top, said bottom, said first end, said second end, said first side, and said second side of said bead are each radiused.

11. The bungee bead apparatus according to claim 10, wherein said length is greater than said width to form an elongated shape for said bead.

12. The bungee bead apparatus according to claim 10, wherein said elongated shape of said head comprises an elliptical shape.

13. The bungee bead apparatus according to claim 10, wherein said elongated shape of said bead comprises a rectangular shape.

14. The bungee bead apparatus according to claim 10, wherein said elongated shape of said bead comprises a race track oval shape.

* * * * *